Patented June 22, 1926.

1,590,156

UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

PROCESS OF TREATING WOOD TAR OIL.

No Drawing. Application filed March 27, 1924. Serial No. 702,411.

This invention relates to the treatment of wood tar oil and distillates thereof and relates particularly to products obtained by reacting on wood tar oil or its distillates with ammonia.

Wood tar oil is the name given to various oily liquids obtained in the distillation of wood, the manufacture of acetate of lime and acetic acid and the rectification of crude wood alcohol. The tars and tar oils from each of these operations are referred to as wood tar oils. They are also sometimes called hard wood oils, chemical oils, light chemical oils etc. Wood tar oil frequently is a mixture of the oils from these various operation. It is therefore rather variable in composition but is always characterized by an offensive empyreumatic odor which restricts these by-product oils to an extremely limited number of uses. Sometimes shingle stains are made from the material but in most cases little more than the fuel value is obtainable.

In the present invention it is an object to produce a vehicle suitable as a solvent for nitrocellulose and specifically adapted for use in making nitrocellulose or pyroxylin paints, varnishes, lacquers and enamels. There is desired a solvent which is not readily miscible with water but which will mix with the various solvents employed in the nitrocellulose industry including ketones such as acetone and methyl ethyl ketone, acetates such as ethyl, propyl, butyl, amyl compounds and methyl and ethyl alcohol, non-solvents such as benzol, toluol and various other hydrocarbons. Higher boiling solvents which serve as water-eliminants making it possible for nitrocellulose solutions containing water to dry to form clear films are very desirable. The treated wood tar oil distillate made in accordance with my invention is well suited for this purpose. Fractions boiling between say 80° C. and 130° C. may be used for the purpose. Fractions boiling higher and those boiling lower also may be used to advantage in some cases.

The essential or preferred step in the operation is the treatment of wood tar oil obtained from any appropriate source with ammonia or ammonia gas, and allowing reaction to take place to bring about a change which is evidenced by a marked difference in odor and is usually accompanied by a change in boiling point. The raw distillate has a rank offensive smell which when it gets into materials, as for example on the garments of the operator will persist indefinitely. This is also true of nitrocellulose films. The use of the wood tar oil has therefore been greatly limited in the past. The ammonia treatment eliminates the rank empyreumatic odor and replaces it by an odor which is more in keeping with accepted solvents and which does not leave an unpleasant odoriferous residue.

The process may be carried out very simply by passing ammonia gas, as for example from a tank containing liquid ammonia, into the wood tar distillate of the particular boiling point desired, for example, a fraction boiling between 60° and 125° to 130° C. may be used. When the liquid is saturated with ammonia, and this may be done at room temperature or at lower temperatures, the mixture is subjected to heat in an autoclave. The pressure is brought to 100 pounds and then the apparatus is allowed to cool. Reaction will have taken place and the odor of ammonia will have largely disappeared. The oil may then be washed with water or with a small amount of dilute hydrochloric acid or other mineral acid and dried. It may be bleached if desired.

A better way is to distil the treated oil and any residual ammonia will pass off in the first runnings. These may be collected separately. The main bulk of the distillate will be a light colored or water white product of pleasant odor. The distillate above 125° C. has a different odor from the lighter fractions. Some of these higher fractions have fruity odors after the ammonia treatment and therefore may be used for various purposes prohibited in the case of the raw wood tar oil.

Again, the raw wood tar oil distillates, if light in color when freshly distilled, darken on standing. This tendency is minimized by the treatment set forth in the present invention.

After the autoclave treatment the product is usually discolored and distillation or rectification yields a light colored or water white material well suited for use as a nitrocellulose solvent. The undistilled or unrectified material may be used directly in some cases.

Instead of raising the temperature to 100° C. and then lowering it may be necessary in some cases to hold the temperature at 100° for an hour or more. Also lower temperatures, as for example between 50 and 75° C., may be used in some cases.

The action is greatly quickened and rendered more thorough by heating under pressure and such method constitutes the preferred feature of the invention. It is possible however to mix the wood tar oil or distillate with aqueous ammonia or to saturate it with ammonia gas and allow the mixture to stand in a closed vessel at room temperature and approximately atmospheric pressure for several days or weeks until reaction has progressed to the desired extent.

The use of aqueous ammonia instead of ammonia gas in heating under pressure also is not precluded. In this case there is of course the subsequent step of separation of the water.

A raw distillate which is apparently dry before treatment with ammonia, frequently will be found after autoclaving to contain several per cent of water. This may render the treated product turbid or separation of the water at the bottom of the receiver may occur.

I do not limit myself to any exact proportions of ammonia gas or ammonium hydroxide as the wood tar oils, being of variable composition, may require variable quantities of ammonia. Good results, as stated, have been obtained by simply saturating the wood tar oil distillate at room temperature and atmospheric pressure with ammonia gas. In one case the gain in weight was found under these circumstances to be between one and two per cent. However the proportion of ammonia may be increased by introducing the gas from a supply of liquid ammonia into the autoclave. In this way the distillate becomes saturated under pressure with ammonia. This may be done when the distillate is cold or after it is heated and if desired the ammonia gas may be introduced at intervals during the heating.

Just what the action of ammonia is on the wood tar oil or fractions thereof is difficult to state. Any aldehydes present are probably reacted upon by the ammonia forming aldehyde-ammonia compounds and these may be retained on distillation. The appearance of water is suggestive of this. A gummy or resinous material usually remains in the distilling apparatus when the ammonia-treated distillate is rectified. Unsaturated aldehydes generally have a very penetrating odor and the ammonia may act to convert these in the manner specified. Ammonia may act to saponify any esters present and thus modify the solvent properties, boiling point and odor.

Another method of treatment of wood tar oil is that of oxidation. If the distillate in question or any other suitable fraction is treated with an oxidizing agent especially in the presence of water an improvement in odor is obtained together with bettered color-stability. Thus the material may be treated with permanganate, bichromate, strong or dilute nitric acid and the like. The best results are obtained by a solution made by dissolving sodium peroxide in water and shaking this solution with the wood tar oil distillate. Heat may be applied to accelerate the change. The use of sodium peroxide however is expensive and cheaper bleaching agents are preferred.

Desirable results are obtained by the treatment of the wood tar oil or a distillate thereof with an aqueous suspension of bleaching powder or an aqueous solution of sodium or other alkaline hypochlorite. The distillate and aqueous bleaching agent may be heated to boiling under a reflux condenser to bring about oxidation producing another form of nitrocellulose solvent embraced under the present invention.

An illustrative procedure is as follows: Chlorine gas is passed into caustic soda solution to make hypochlorite. A 10 per cent solution of the hypochlorite is mixed with an equal volume of wood tar oil distillate (cut below 125 or 130° C.). The mixture is agitated and heated for a period of 1 or 2 hours. The temperature may be allowed to rise to the boiling point. A reflux condenser may be used. Finally the lower aqueous layer is separated from the treated wood tar oil distillate and the latter may be dried and rectified if desired by redistillation. A hypochlorite solution of greater strength may be employed if desired.

The product obtained in this way will be found of improved color-stability. The odor is modified, no longer having the rank offensive empyreumatic odor characteristic of the raw wood tar but being of a fairly agreeable odor somewhat suggestive of ketones.

After the distillate has been treated with the oxidizing agent it will generally be found to have a yellow to brownish color. While it is possible to treat the oil with substances such as fuller's earth, activated charcoal and the like I prefer to distil the oxidized material whereby a light colored to water white distillate is obtained adapted for use as a nitrocellulose solvent.

In the foregoing I have referred to a distillate boiling up to about 130° C. But I do not wish to be limited to this precise point as the wood tar oils from different sources vary considerably and in some cases it may be expedient to arrest the distillation at a lower temperature than that specified while in other cases I may wish to carry the distillation higher.

Another method of treatment involves subjecting the wood tar distillate to the action first of ammonia or other equivalent substance then to the action of an oxidizing agent. A solvent having a pleasing odor may be obtained by the ammonia treatment described above followed by agitation of the product with a 10 per cent aqueous solution of sodium hypochlorite in the cold. In other cases the procedure may be reversed, the raw wood tar distillate first being treated with an oxidizing agent such as a suspension of bleaching powder or preferably a solution of sodium hypochlorite, separating the oxidized distillate and treating it with ammonia gas preferably heating under pressure. These operations performed successively yield liquids having different solvent powers and modified odors and boiling points.

A specific example is the following: Wood tar oil was distilled and 218 c. c. of a fraction boiling between 42° and 130° C. was collected. The amount distilling between 42° and 60° C. was very small. 218 c. c. of a 10 per cent solution of caustic soda was saturated with chlorine gas and this reagent added to the distillate. The mixture was agitated and evolution of heat was noticed. The mixture was heated under reflux condenser to the boiling point for 45 minutes. The water-insoluble layer was withdrawn and distilled. The initial boiling point was 79° C. The following indicates the range of boiling, the right hand column giving the total distillate at any given temperature.

| To | | |
|---|---|---|
| 85° C. | 16 c. c. |
| 90° C. | 24 c. c. |
| 95° C. | 30 c. c. |
| 100° C. | 40 c. c. |
| 105° C. | 52 c. c. |
| 110° C. | 74 c. c. |
| 115° C. | 106 c. c. |
| 120° C. | 134 c. c. |
| 125° C. | 156 c. c. |
| 130° C. | 172 c. c. |
| 135° C. | 184 c. c. |
| 137° C. | 190 c. c. |

The entire distillate obtained above, or any fraction thereof, may be saturated with ammonia gas and heated for one hour to a pressure of 100 pounds.

The effect of ammonia on wood tar oil distillates appears to be deep seated. The boiling point is generally raised and this is oftentimes of advantage in producing special high boiling solvents acting as water-eliminants in making nitrocellulose films. Some tar is formed as will be indicated from the following illustration.

A quantity of crude wood tar oil was distilled and the fraction boiling up to 130° C. was taken for treatment. This amounted to approximately one-half of the total sample distilled. The first runnings in distillation were at about 40° C. but only an insignificant amount distilled up to 60° C. 500 c. c. of the distillate to 130° C. was saturated with ammonia at room temperature. The gas was absorbed so rapidly that the bubbles quickly disappeared on entering the liquid. The treatment with ammonia was kept up until the gas bubbled through freely. Then the gas-charged liquid was heated in an autoclave to about 100 pounds pressure for one hour. When distilled the first drop came over at 70° C. and 438 c. c. were collected up to 150° C. A viscous black tarry mass amounting to about 30 c. c. remained in the distillation flask.

Caustic soda or caustic potash or other alkali may be present with the ammonia during the treatment as aforesaid. In some cases the ammonia may be replaced by other alkaline agents as for example caustic soda. When the latter in dry powdered form is added to some wood tar oils, a thickening is observed and eventually the liquid is converted into a jelly or paste. This material may be washed with water and distilled, or the jelly may be heated under pressure in an autoclave.

Solutions of nitrocellulose may be made for example by dissolving several ounces of soluble cotton in the ammonia-treated and rectified distillate. A distillate boiling between say 70° C. and 115° C. may be employed. Other fractions, for example 80–135° C., etc., likewise may be used. In such pyroxylin solutions there may be incorporated various materials such as natural or synthetic resins, softening agents such as boiled or blown oils including rapeseed oil, castor oil and the like, or substances such as diethylphthalate, camphor, triphenylphosphate, etc., pigments and coloring agents.

A curious observation has been made that wood tar oil distillate treated as above with certain grades of nitrocellulose yield solutions which have a less viscosity than results when using a powerful solvent such as acetone, while in other grades of nitrocellulose the acetone solutions are of less viscosity.

There are on the market certain grades of nitrocellulose or soluble cottons which are of very low viscosity and which usually are made by heating nitrocellulose of higher viscosity to bring about its conversion to the less viscous form. Such heat-treated low viscosity soluble cottons when dissolved in certain wood tar oil distillates yield solutions which are of a lower viscosity than is the case when acetone is the solvent. This is particularly important in the manufacture of paints and varnishes which are applied by spraying and in which the maximum amount of solid material including a relatively high proportion of nitrocellulose is desired in order to secure a good coating or covering effect by a single application.

The following illustrates a formula for a paint mixture, it being understood that by omission of the pigment a varnish or lacquer material will result.

| | Parts. |
|---|---|
| Heat-treated low viscosity soluble cotton | 20–40 |
| Synthetic resin | 30–50 |
| Diethylphthalate | 5–10 |
| Wood tar oil distillate | 110 |
| Denatured alcohol | 55 |
| Benzol | 55 |
| Prussian blue | 8 |

The soluble cotton used is one which if its viscosity is represented by the unit 1 a cotton of normal viscosity which has not been heat-treated would have a rating of say 40 to 80. The synthetic resin employed may be a rosin phthalic glyceride product as set forth in my prior patent applications. The denatured alcohol may be ordinary water-containing alcohol, although anhydrous alcohol may be employed if desired. The wood tar oil distillate may be a fraction which has been treated with ammonia and subsequently washed with sodium hypochlorite and distilled to include that fraction coming over up to 115° C.

What I claim is:—

1. The process of treating wood tar oil distillate which comprises reacting on said distillate with ammonia and subsequently with an oxidizing agent.

2. The process which comprises treating wood tar oil distillate with an alkali comprising ammonia and subsequently washing the product with an aqueous solution of a hypochlorite.

CARLETON ELLIS.